United States Patent [19] Witteles

[11] 3,723,873
[45] Mar. 27, 1973

[54] RADIATION METHOD FOR DETERMINING SEMICONDUCTOR STABILITY AND RELIABILITY

[75] Inventor: Abraham A. Witteles, Parsippany-Troy Hills, N.J.

[73] Assignee: The Singer Company, New York, N.Y.

[22] Filed: Jan. 21, 1971

[21] Appl. No.: 108,536

[52] U.S. Cl. ..............324/158 T, 29/574, 324/158 D
[51] Int. Cl. ..........................G01r 31/22, H01l 7/00
[58] Field of Search...........324/158 D, 158 T, 158 R; 29/574

[56] References Cited

OTHER PUBLICATIONS

Snow, E. H. et al.; "Effects of Ionizing..."; Proc. of the IEEE; vol. 55; no. 7; July 1967; pg. 1168–1185
Nelson, D. L. et al.; "Mechanisms of Ionizing..."; IEEE Transactions of Nuclear Science; V. NS-13, no. 6; Dec. 1966; pp. 197–206
Gregory, B. L.; "A Comparison..."; IEEE Trans. on Electron Devices; May 1965; pg.254–258

*Primary Examiner*—Rudolph V. Rolinec
*Assistant Examiner*—Ernest F. Karlsen
*Attorney*—S. A. Giarratana and Thomas W. Kennedy

[57] ABSTRACT

A semiconductor wafer is tested for stability and reliability by subjecting preselected chips on the wafer to a predetermined dose of ionizing radiation and measuring the resulting change in electrical operating parameters of the preselected chips to obtain an indication of the general stability and reliability of the entire wafer being tested.

11 Claims, 3 Drawing Figures

Patented March 27, 1973 3,723,873

INVENTOR.
ABRAHAM A. WITTELES
BY
ATTORNEY

RADIATION METHOD FOR DETERMINING SEMICONDUCTOR STABILITY AND RELIABILITY

BACKGROUND OF THE INVENTION

1. Field of the Invention

This invention relates to semiconductor devices and more particularly to a method for determining the stability and reliability of semiconductor wafers by the use of ionizing radiation.

2. Description of the Prior Art

A common method of manufacturing semiconductor devices involves the production of relatively large semiconductor wafers which contain many semiconductor "chips" or individual semi-conductor components. The chips or individual semiconductor devices formed on each wafer are then processed into individual circuit components by the usual scribing, mounting and bonding operations. Since some uncertainty is involved in present day semiconductor manufacturing techniques, it is quite important that the semiconductor wafers and individual components be adequately tested for electrical stability and reliability before the final manufacturing operations are performed. This testing is presently accomplished by subjecting an entire semiconductor wafer to a relatively high temperature for extended time periods and then measuring the effect of the elevated temperatures on selected chips or components on the wafer to determine the degree of electrical stability of the entire wafer. Since the temperatures to which the entire wafer is exposed usually exceed the intended range of operating temperatures, usually by a factor of three, the electrical characteristics of all of the chips or components on the wafer are changed because of the annealing effect of the high temperature environment. Accordingly, the wafer may be rendered unfit for its intended purpose. Although quasi-isothermal processes have been developed to reduce this damage to the components on the wafer, the effects caused by the high temperature environment can not be eliminated altogether. Additionally, the elevated temperature method of semiconductor testing is time consuming and expensive. It is therefore believed apparent that a suitable method of semiconductor testing would permit the testing of selected individual semiconductor devices on a wafer without altering the electrical characteristics of the remaining devices on the wafer being tested.

SUMMARY OF THE INVENTION

It is an object of this invention to provide a method of testing semiconductor devices without subjecting such devices to elevated temperatures.

It is a further object of this invention to provide a method of testing individual chips or semiconductor components on wafers or substrates without altering the electrical characteristics of the remaining chips or components on the wafer or substrate.

It is a still further object of this invention to provide a relatively inexpensive, highly reliable method of testing semiconductor wafers and the like which is capable of being rapidly performed.

Briefly, the method of the invention provides for the testing of semiconductor wafers having a plurality of semiconductor chips or devices thereon by subjecting a number of preselected chips or components on each wafer being tested to a predetermined dose of ionizing radiation to cause a change in an electrical operating parameter of each of the preselected chips which is sensitive to the surface states of the chips, and then measuring the change in the parameter to provide an indication of the stability and reliability of the entire wafer. The individual chip or components on each wafer which are selected for testing may be sequentially irradiated by the ionizing radiation by automated means, such as a programmed indexing machine used with a well collimated radiation beam, or the entire wafer may be subjected to the radiation by utilizing an apertured radiation shielding mask. Although the method of the invention is particularly suited for the testing of semiconductor wafers or substrates having a plurality of individual semiconductors thereon, the method of the invention is also suited for the testing of individual semiconductor devices when it is not desirable to subject the component to an elevated temperature for testing by the usual method.

The nature of the invention and other objects and additional advantages thereof will be more readily understood by those skilled in the art after consideration of the following detailed description taken in conjunction with the accompanying drawing.

DESCRIPTION OF THE PREFERRED EMBODIMENT OF THE INVENTION

Figure 1:
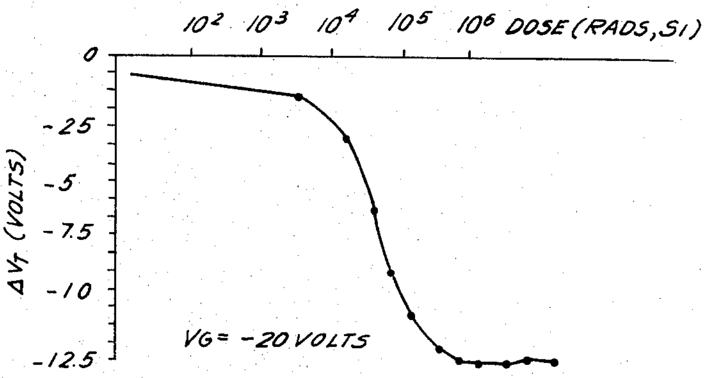
FIG. 1 is a graph showing the change in threshold voltage of a typical, commercially-available semiconductor device as a function of applied radiation dosage.

In general, all semiconductor devices, including Field effect and bipolar types, experience a change in electrical operating parameters when subjected to ionizing radiation. The amount of change or degradation of operating parameters is dependent upon the surface states of the device, such as surface passivation, the amount of ionic contamination present in the surface layer, and the surface construction techniques employed. Accordingly, when a semiconductor device is exposed to ionizing radiation and an electrical operating parameter which depends upon the surface states of the device is monitored, it is possible to determine the electrical stability and reliability of the device solely by reference to the amount of degradation of the operating parameter being observed. For example, FIG. 1 of the drawings illustrates $\Delta V_T$, the change in threshold voltage experienced by a typical, commercially-available metal oxide semiconductor (MOS) device when subjected to ionizing radiation from the isotope Cobalt 60. The radiation from this source consists primarily of gamma rays. A gate bias of −20 volts was applied during irradiation. This graphical representation indicates that the dosage in rads (S*i*) is increased, the threshold voltage $V_T$ of the semiconductor is increasingly shifted in a negative direction until a maximum shift of approximately 12.5 volts is reached.

In accordance with the present invention, selected semiconductor chips or components on a semiconductor wafer are subjected to ionizing radiation and the change in an electrical operating parameter which depends upon the surface states of the semiconductor is monitored to determine the degradation thereof, to thereby yield a direct quantitative indication of the general stability and reliability of the entire wafer. A typical radiation dose which would accomplish an observable change in an operating parameter would be 50,000 rads of X-rays or gamma rays, for example. The irradiation of the preselected chips on the wafer may be accomplished by several methods. In one method, the semiconductor wafer may be placed on an indexing machine which is capable of physically moving the wafer with respect to a well collimated beam of radiation in discrete steps. When this method is employed, the selected chips are sequentially irradiated by the single, well collimated radiation beam. Since this method will require the indexing machine to move the wafer a certain number of indices or increments after the required dosage is applied to a particular chip, the exact amount of wafer displacement may be programmed automatically into the indexing machine by well-known automation techniques, such as a taped data feed, for example. An X-ray generator may be conveniently employed to produce the well collimated beam of radiation required for the ionization of the semiconductor. When this method is used to provide the semiconductor with the required dosage of ionizing radiation, it is apparent that the preselected chips only are subjected to the radiation and the remaining chips on the wafer are not harmed any way by the radiation or testing procedure. When the irradiation of each of the chips selected for testing on the wafer is completed, each of the selected chips is electrically tested by known methods to determine the degradation or change in the electrical operating parameter utilized for the test procedure. For example, when Field effect semiconductor devices are tested, the threshold voltage $V_T$ and the drain to source current (reverse bias) $I_{DSS}$ may be monitored to observe the effect of the ionizing radiation upon the surface states of the devices. In a similar fashion, when bipolar semiconductor devices are tested, the operating parameters observed may be the collector-emitter voltage at saturation $V_{CE(SAT)}$, the base-emitter voltage $V_{BE}$, or the current gain $\beta$ of the unit. Regardless of the parameter selected for monitoring, the operating stability of the semiconductor device may be predicted from an inspection of the amount of degradation suffered by the device after the ionizing radiation has been applied and for purposes of mass production of semiconductors, predetermined limits of parameter change may be established for the particular type of semiconductor under test.

Figure 2:
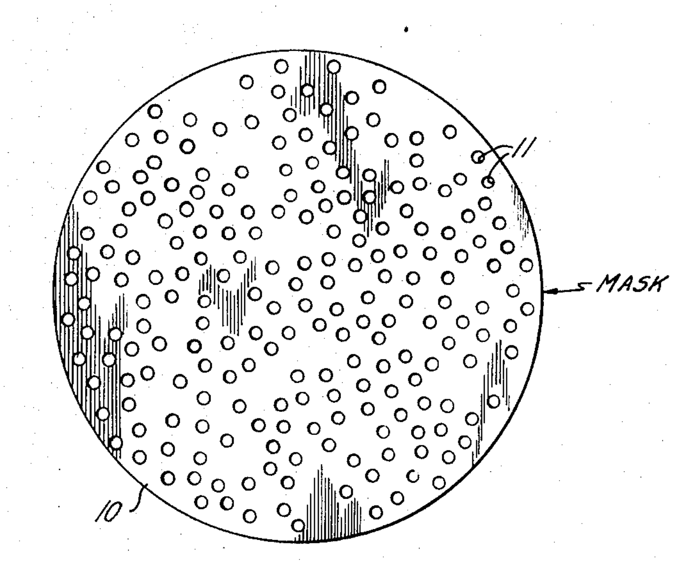
FIG. 2 is a plan view of an apertured mask suitable for use with the method of the invention.
Figure 3:
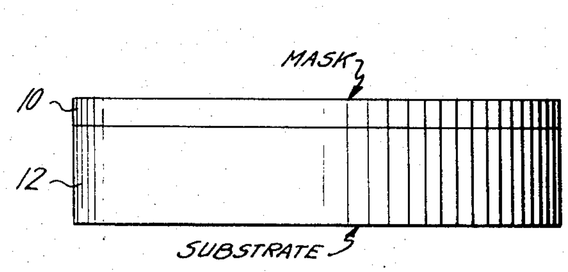
FIG. 3 is an elevational view of a semiconductor substrate showing the mask of FIG. 2 positioned thereon.

The invention also contemplates an alternate method of applying the required dosage of ionizing radiation to the selected chips on the semiconductor wafer being tested. In the alternate method, a mask 10, such as shown in FIG. 2 of the drawing, is provided to cover the wafer or substrate upon which the selected chips are mounted. The mask 10 is fabricated of a radiation shielding material which will prevent the radiation from the source being utilized from reaching the surface of the wafer under test. A plurality of apertures 11 are formed in the mask at locations corresponding to the locations of the chips selected for irradiation on the surface of the wafer, so that when the mask is in place on the wafer or substrate 12 as shown in FIG. 3 of the drawing, the ionizing radiation from the source is applied only to the selected chips and not to the remaining chips on the surface of the wafer. Accordingly, by this technique, all of the selected chips are irradiated simultaneously from a single source of radiation and the test procedure is rapidly completed. When the mask of FIGS. 2 and 3 of the drawing is employed, the ionizing radiation may conveniently comprise X-rays from a unit such as Picker Corporations's Model 6231 which is designed to operate at 110 KVP and 3.5 ma. In this event, the mask may be fabricated from a one-eighth inch steel plate. The X-ray absorption by the chips on the wafer being tested may be maximized by utilizing lower energy X-rays. The lower energy X-rays may be generated on the aforementioned Picker Model 6231 machine by lowering the X-ray plate voltage to approximately 50 KVP and increasing the current to about 5 ma, while utilizing a Berrylium window to minimize absorption through the tube. With these settings, a radiation of about 4,000 rads per minute will be applied 6 inches from the metallic mask, so that the required irradiation time for the application of the process to a wafer would be roughly 13 minutes.

Although X-rays constitute an economical, commercially-available type of ionizing radiation for the method of the invention, the method is not limited solely to X-rays, since any type of ionizing radiation will suffice. For example, an alternate method of irradiating the semiconductor wafer with 50,000 rads of ionizing radiation would be to employ a radioactive chamber having a Cobalt 60 source or a Cesium 137 source. The Cesium 137 source would be preferable to the Cobalt 60 source since the Cesium source emits gamma rays with an energy of 0.662 Mev and has a half life of 30 years compared to the 5.24 years of half life for the Cobalt 60 source. When such a unit is employed with a relatively small size Cesium 137 source, the wafer will be exposed to a dose-rate of 50,000 rads per hour so that the desired 50,000 rad dosage may be achieved in one hour. As a further example, the 50,000 rad dosage of ionizing radiation may also be derived from the use of a radioisotope which emits alpha particles. This type of radiation source has the advantage that the alpha particles, being quite massive and possessing a positive electric charge, are quickly slowed down and absorbed by the silicon sample constituting the semiconductor being tested, so that the radiation flux required for the performance of the testing procedure is materially lessened. Preferably an alpha particle source emitting alpha particles with an energy greater than 5 Mev should be employed. For example, a possible source would be Am 241 which has an alpha particle energy of about 5.5 Mev and a half life of 458 years. Although alpha particle sources have the advantage of permitting a low radiation flux to be used, they are highly radioactive and are very difficult to employ in commercial production facilities, Additionally, the required exposure time to achieve the recommended dosage could be quite long since a high flux alpha exposure can not be utilized because of the serious surface damage to the semiconductor wafer resulting from the high degree of surface absorption.

From the foregoing description of the semiconductor testing method of the invention, it may be seen that an entire semiconductor wafer may be tested for electrical reliability and stability by testing only selected chips and components on the wafer and without causing any damage to the untested components on the wafer. Accordingly, a semiconductor manufacturer may select chips on predetermined sections of the semiconductor wafers being manufactured and may perform the test procedure of the invention without damaging the remaining parts of the wafer. This permits the test procedure to be carried out before the chips are scribed, mounted or bonded and before the high cost finishing operations are performed on the individual chips of the wafer. When the chips selected for irradiation are suitably selected to represent the entire surface area of the wafer, the manufacturer can select those sections of the wafer which have the required stability for further processing and may discard the remaining sections of the wafer. Since the method of the invention does not require any heating of the wafer, the long time periods required for such heating are eliminated and the testing procedure may be carried out in a much smaller time interval. Furthermore, it has been found that the stability and reliability of the wafers tested by the method of the invention are much more accurately predicted than when the older, high temperature testing technique is employed, since the degradation of the electrical operating parameters of the semiconductor devices are much more reproducible and repeatable at a given radiation dosage than the degradation suffered by semiconductor devices subjected to the high temperature methods of testing at a given temperature.

It is believed apparent that many changes could be made in the steps of the foregoing method of testing of semiconductor devices and the method of the invention could be performed in many ways without departing from the scope thereof. For example, the ionizing radiation sources could be varied and the apparatus employed to irradiate the semiconductor devices under test could be varied in accordance with known techniques. Accordingly, it is intended that all matter contained in the above description or shown in the accompanying drawing shall be interpreted as illustrative and not in a limiting sense.

What is claimed is:

1. The method of determining the stability and reliability of semiconductor devices associated with a common structure or wafer comprising the steps of subjecting at least one semiconductor device from said wafer to a predetermined dose of ionizing radiation to cause a change in an electrical operating parameter of the device which is sensitive to the surface states of the device; and measuring the change in said parameter to provide an indication of the stability and reliability of the remaining semiconductor devices.

2. The method of claim 1 wherein said predetermined dose of radiation is at least 50,000 rads.

3. The method of claim 1 wherein said radiation is provided by an X-ray source.

4. The method of claim 1 wherein said radiation is provided by a gamma ray source.

5. The method of claim 1 wherein said radiation is provided by an alpha ray source.

6. The method of claim 1 wherein said semiconductor device is a Field effect semiconductor and the said electrical operating parameter is selected from the group comprising the threshold voltage and the drain to source current of the device.

7. The method of claim 1 wherein said semiconductor device is a bipolar semiconductor and the said electrical operating parameter is selected from the group comprising the current gain, the saturation collector-emitter voltage and the base-emitter voltage of the device.

8. The method of testing semiconductor wafers having a plurality of semiconductor chips thereon for stability and reliability comprising the steps of subjecting a number of preselected chips on each wafer being tested to a predetermined dose of ionizing radiation to cause a change in an electrical operating parameter of each preselected chip which is sensitive to the surface states of the chip; and measuring the change in said parameter for each preselected chip to provide an indication of the stability and reliability of the entire wafer.

9. The method of claim 8 wherein the predetermined dose of radiation for each preselected chip is at least 50,000 rads.

10. The method of claim 9 wherein the wafer being tested is placed on a programmed indexing machine for movement thereby and the preselected chips are sequentially irradiated by a well collimated beam of said ionizing radiation.

11. The method of claim 9 wherein a radiation shielding mask is placed over the wafer being tested, said mask having apertures formed therein corresponding to said preselected chips, and wherein the shielded wafer is subjected to said ionizing radiation, so that said preselected chips are simultaneously irradiated.

* * * * *